United States Patent [19]

Braud et al.

[11] Patent Number: 5,962,564
[45] Date of Patent: Oct. 5, 1999

[54] WATER BASED HIGH SOLIDS ADHESIVES AND ADHESIVE APPLICATION SYSTEM INCLUDING PRESSURIZED CANISTER

[75] Inventors: John W. Braud, Dalton; Helen Grace Gilbreath, Calhoun, both of Ga.

[73] Assignee: XL Corporation, Calhoun, Ga.

[ * ] Notice: This patent is subject to a terminal disclaimer.

[21] Appl. No.: 09/056,811

[22] Filed: Apr. 8, 1998

Related U.S. Application Data

[60] Provisional application No. 60/043,128, Apr. 9, 1997.
[51] Int. Cl.$^6$ .............................. C08L 23/00; C08K 5/01
[52] U.S. Cl. .......................... 524/270; 524/274; 524/486; 524/501; 524/764
[58] Field of Search ..................................... 524/270, 274, 524/501, 486, 764; 470/186, 211

[56] References Cited

U.S. PATENT DOCUMENTS 5,565,511 10/1996 Braud et al. ............................ 524/270
5,652,288  7/1997 Wood et al. ............................ 524/274

*Primary Examiner*—Tae Yoon
*Attorney, Agent, or Firm*—Kerkam, Stowell, Kondracki & Clarke, P.C.; Edward J. Kondracki

[57] ABSTRACT

A method for producing a fast drying high solids adhesive wherein a water based polymer emulsion (latex) is modified with unemulsified elasticizing oils and reinforcing-tackifying resins to produce a stable emulsion of polymer, oil and resin without the use of additional emulsifiers or volatile organic solvents. When packaged in pressurizable canisters along with a suitable propellant, the adhesive may be sprayed through a suitable nozzle and deposited in a thin layer to form an adhesive film which has excellent bonding characteristics for many laminates such as fabric or textiles, wood, plastics, metals and rubber, and for adhering flooring materials such as carpet, linoleum, tiles and artificial grass to a variety of substrates.

7 Claims, 1 Drawing Sheet

WATER BASED HIGH SOLIDS ADHESIVES AND ADHESIVE APPLICATION SYSTEM INCLUDING PRESSURIZED CANISTER

CROSS REFERENCE TO RELATED APPLICATION

The subject application is based on subject matter disclosed in provisional application Ser. No. 60/043,128 filed in the name of John Wayne Braud and Helen Grace Gilbreath and claims priority of said application under the provisions of 35 USC §119(e).

FIELD OF THE INVENTION

The present invention relates to water-based adhesives and in particular to a high solids content, low viscosity, low volatile organic compound (VOC) adhesive suitable for packaging in pressurized containers to be later sprayed, and an adhesive application system including a pressurized canister having the adhesive and a propellant packaged therein.

BACKGROUND OF THE INVENTION

When preparing adhesives for packaging in aerosol canisters or containers, solvent-based adhesives have been employed almost exclusively because of their ease of use, solvency in the propellants, wide range of tackiness, quick drying rates and economy. These adhesives are prepared by dissolving solid polymers, plasticizing oils, tackifying and reinforcing resins and preservatives in volatile organic solvents such as hexane, pentane, toluene, xylene, methylene chloride, 1, 1, 1, trichloroethane, naphtha and methyl ethyl ketone. These solvent-based adhesives have a number of undesirable characteristics such as being health hazards, their flammability, and they release large amounts of harmful volatile organic compounds into the atmosphere.

The product of the present invention is an adhesive which is non-flammable, does not constitute a health hazard, and whose only volatile ingredient is water. When packaged along with a non-flammable, non-polluting propellant in pressurized canisters, a useful, sprayable adhesive is obtained which has all of the desirable attributes and none of the undesirable attributes of prior art spray or aerosol adhesives.

Common adhesives intended for use in building construction and with flooring and floorcovering materials, such as, for example, wood plank, parquet, artificial turf, boat or other marine carpets, indoor carpet, rubber flooring, cove base molding etc., are water-based emulsions based upon either acrylic or styrene butadiene (SBR) latex. Acrylic-based formulas, due to their expense and low bond strength, are generally reserved for use only when necessary for a pressure-sensitive applications, for resistance to plasticizers in pure vinyl backings or for resistance to sunlight in outdoor applications. SBR-based adhesives for use in building construction, flooring and floorcovering are, by far, the predominant type and require the addition of a tackifier to develop bond strength and a proper modulus.

The traditional means of producing an adhesive of this type is to emulsify the SBR latex to form a latex emulsion. Additional constituent components, such as, for example, process oil, tackifying resins, mineral fillers, etc., are also emulsified. The latex emulsion is then added to the constituent component emulsion under various heat and pressure conditions to form the adhesives.

The adhesives produced by the traditional method have several associated disadvantages, such as, for example, poor water resistance, slow drying, high volatile organic compound content and limitations on the final solids content of the adhesive. These disadvantages are generally due to the use of emulsifiers and thickeners in forming the adhesive. Emulsifiers and thickeners are generally water-soluble compounds that remain in the dried adhesive and tend to adversely affect the water resistance and durability of the resultant adhesive bond. Water soluble compounds also tend to retard the drying rate of the water-based adhesive. Moreover, using a method in which all constituent components are emulsified prior to mixing severely limits the solids content of the final product. It is particularly desirable to produce adhesives having a high solids content due to their superior bonding and drying characteristics.

It is also desirable to eliminate the presence of volatile organic compounds (VOC) generally present in traditional adhesives of the type described above. VOCs are generally used to dissolve the tackifying resins which are incorporated into the adhesive to develop bond strength and an appropriate modulus. Since these resins are generally solid at room temperature, they must be liquified in order to be incorporated into the constituent component emulsion. This is usually done by dissolving the resin in an organic solvent carrier. Organic solvents are usually quite volatile and may have adverse effects on the environment due to their contribution to air pollution. VOCs also degrade the performance of the resulting adhesive by slowing down curing time, swelling and weakening the rubber component, shortening the life of the applied product and raising the level of emulsifier required for emulsion stability, which, in turn, further degrades the adhesive. The use of organic solvents to produce adhesives, in some cases, also requires the use of expensive solvent recovery equipment required by government regulation and has the further disadvantage of exposing employees to the potentially harmful organic solvents.

VOCs are also incorporated into latex-based adhesives to improve their freeze resistance. Because traditionally formulated SBR-based adhesives have a high water content, they usually have poor freeze resistance. Manufacturers have sought to overcome the poor freeze resistance by introducing VOCs such as methanol and glycol to lower the freezing point of SBR-based adhesives. However, the addition of these VOCs results in many of the same disadvantages set forth above. In order to overcome the disadvantages associated with the use of VOCs for improved freeze resistance, some manufacturers have attempted to substitute non-volatile compounds such as sorbitol to improve freeze resistance. While freeze resistance may be improved in this manner, the water resistance of adhesive using non-volatile water-soluble compounds such as sorbitol is adversely affected.

It is desirable, in many applications involving adhering floor coverings to a substrate, to apply the adhesive quickly over large surface areas. The use of a propellant to spray the adhesive would provide the ability to do so, however, prior to the present invention, sprayable adhesives were generally required to have low solids contents in order to provide a sufficiently low viscosity, and were mostly solvent-based adhesives. Further, the propellants used heretofore have generally been either flammable, or pollutants, or both. Thus, such products have not met with a substantial degree of success commercially, and/or have sufficient drawbacks that a need continues to exists for an adhesive application system in which a water-based, high solids adhesive is packaged in a spray canister with a non-flammable, non-polluting propellant.

It is an important object of this invention to provide an adhesive having a high solids content.

It is a further object of the present invention to provide an adhesive having improved bond strength and stability.

It is another object of the present invention to provide an adhesive containing little or no volatile organic compounds.

It is another object of the present invention to provide an adhesive containing little or no volatile organic compounds.

It is yet another object of the present invention to provide an adhesive that produces a bond having improved water resistance and durability.

It is still another object of the present invention to provide an adhesive having improved drying rates and faster application characteristics over prior art water-based adhesives.

Another object of the present invention is to provide a freeze-stable SBR-based adhesive having no VOCs and improved water resistance.

It is further an object of this invention to provide an adhesive with a low viscosity suitable for spray application.

It is also a objective of this invention to provide a water based adhesive which is stable under pressure in metal canisters.

Another object of this invention is to yield a water based adhesive which is not coagulated or harmed by the propellant which ejects it from the canister.

It is a further important object of the present invention to provide an adhesive that will be stable through the large pressure drop experienced when released from a pressurized canister, and that will not foul or clog the nozzle. adhesive is pressurized and sprayed from a canister by a non-flammable, non-polluting propellant.

It is a further object of the present invention to provide an adhesive having the advantages described above and which will not be a health hazard.

Another object of the present method is to provide a non-flammable adhesive.

A further object of the invention is to provide an adhesive which will adhere carpet to floors.

It is also an object of the present invention to provide an adhesive which will adhere athletic surfaces and artificial grass to substrates such as concrete and wood.

It is a further object of the present invention to provide an adhesive useful for gluing textile fabrics, carpets and plastic films to fiberglass reinforced plastics, wood, metal, leather, rubber polyvinylchloride and polyurethane components.

It is an additional important object of the present invention to provide an aerosolized adhesive composition for use in aerosol spray applications.

SUMMARY OF THE INVENTION

In order to realize these and other objects and to overcome the shortcomings set forth above with respect to conventional adhesives, a process for formulating an adhesive includes the steps of: stabilizing an emulsion of latex by adding a caustic agent to the latex emulsion to raise the pH of the emulsion: forming a mixture of dissolving oils, such as, for example naphthenic rubber process oil, and tackifying resins; mixing the stabilized latex emulsion with the mixture of dissolving oils and tackifying resins using vigorous agitation until a homogeneous emulsion is formed; and adding a predetermined amount of water to the homogeneous emulsion to form the adhesive. In the alternative method, a small amount of mineral filler is also added in the step of adding the water.

Forming the adhesive in the above described manner provides an adhesive having very high solids content and improved durability, drying, bonding and water resistance. The process involves dissolving oils and tackifying resins, and possibly a minor amount of mineral filler, directly into a latex emulsion without emulsifying or dispersing the oils or resins prior to mixing. The method takes advantage of the excess emulsifier and stability of the latex emulsion combined with the mutual solubility of the latex polymer, oil and resin to produce a stable high solids viscous emulsion without the use of additional emulsifiers or thickening agents.

The present invention also eliminates the presence of volatile organic compounds. This is made possible by dissolving the resin directly into the oil without first using an organic solvent. In addition, further use of volatile organics is not required for increasing freeze resistance due to the low water content of the adhesive thus produced.

In addition, it is to be understood that the invention is not limited to any particular latex emulsion. While styrene butadiene latex is preferred, other latex emulsions of, for example, acrylic, nitrile, neoprene, vinyl acetate, ethylene vinyl acetate copolymers, carboxylated SBR, etc. or blends thereof, may be used depending upon the type of material being used and the substrate to which the material is being bonded.

The invention also provides an adhesive application system which includes a sprayable adhesive having an adhesive composition that is readily susceptible of being pressurized and sprayed by non-flammable, non-polluting propellants. The sprayable adhesive is packaged together with the propellant in a pressurized canister or cylinder which can be recharged when the propellant and adhesive is spent.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments taken in conjunction with the accompanying drawing.

DETAILED DESCRIPTION OF PREFERRED EMBODIMENTS

Figure 1:
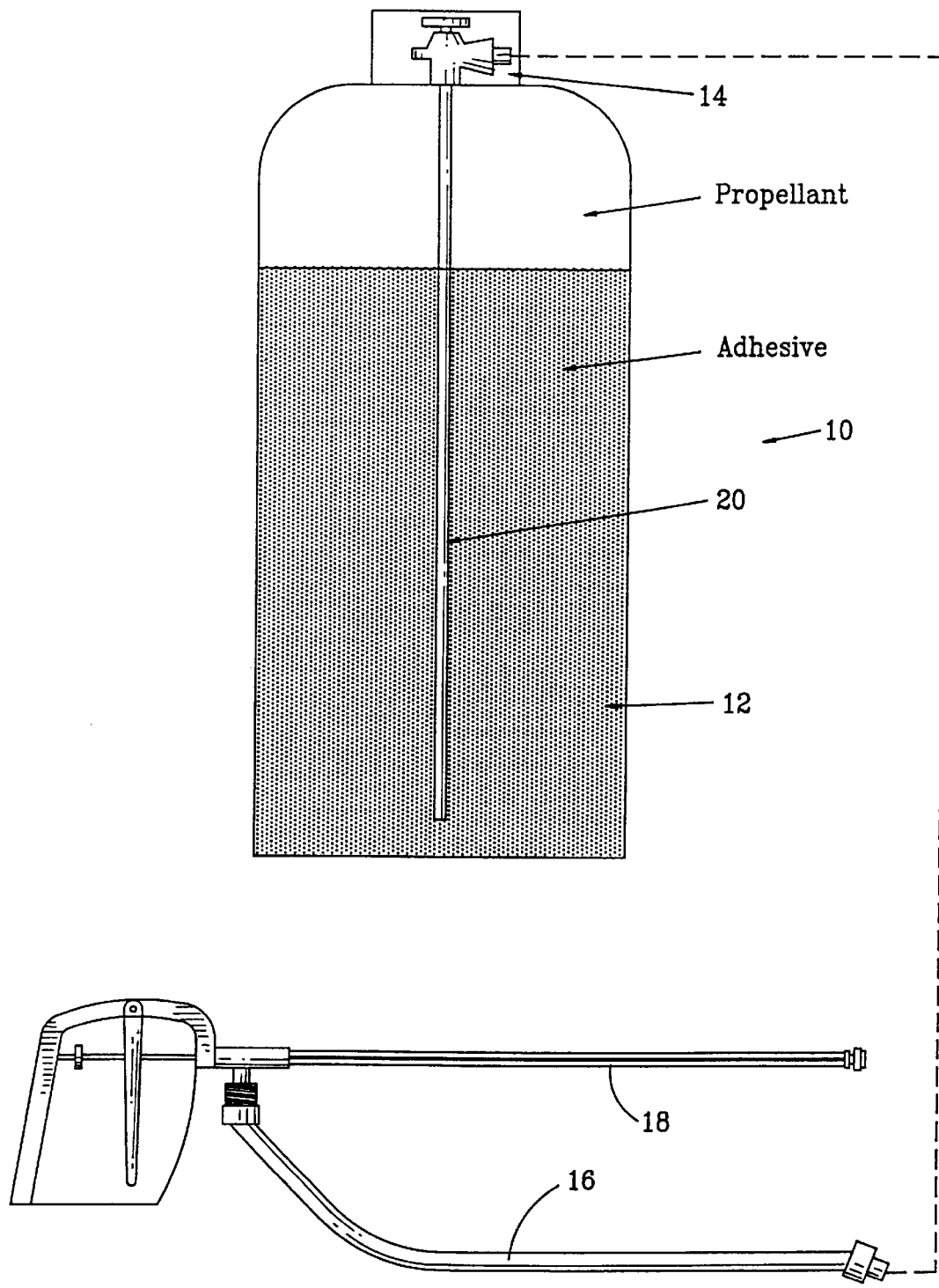
FIG. 1 is a substantially schematic view of the adhesive application system of the present invention wherein a pressure cylinder is shown as containing an adhesive and a propellant therein.

In order to increase the solids content of conventional latex-based adhesives, the present invention takes advantage of the excess emulsifier and stability of a stabilized latex emulsion combined with the mutual solubility of latex polymer, process oil and resin to produce a stable high solids viscous emulsion without the use of additional emulsifiers or thickening agents. Additional emulsifiers and thickening agents contribute to degraded adhesive characteristics and a decrease in solids content of the resultant adhesive. In this process, dissolved oils and tackifying resins are introduced directly into a stabilized latex emulsion to form a high solids adhesive having improved adhesive characteristics and freeze resistance.

The process begins with stabilization of a commercially available latex emulsion, such as, for example, Intex 131 and 132 available from Enichem America; LPF 5356, LPH 6733, LPH 6687, all available from Goodyear; Butafan 125 and 104, available from BASF Corporation; and Polytex 425, available from Rohm and Haas Corp. While SBR latex emulsions are specified herein, it is understood that various latex emulsions, such as, for example, acrylic homopolymers or copolymers, acrylonitrile butadiene (NBR), polychloroprene (neoprene), vinyl acetates, ethylene vinyl acetate copolymers, carboxylated SBR, etc., or blends thereof, may be used depending upon the materials being applied, the substrate to which the materials are bonded and the environmental conditions in which the bond will be present. The total solids of the preferred SBR latex emulsion is preferably in the range of 68–70% total solids. However, it is understood that the invention is not limited to a SBR latex emulsion having 68–70% total solids.

The latex emulsion must then be stabilized in order to allow the direct addition of constituent components without using additional emulsifiers or thickeners. To stabilize the latex emulsion, the latex emulsion is buffered to a pH in the range of 11.0 by a basic pH material, such as, for example, caustic soda, caustic potash, ammoniated tallow, dimethyl amine, dimethyl amine, ammonia, dimethyl amino ethanol, urea, dicthanol amine, triethanol amine, morpholine, etc. By buffering the latex emulsion in this manner, the emulsion is made stable and is ready to be mixed with the additional constituent components to form a stable high solids adhesive. The choice of buffering agent depends upon the latex emulsion or combination of emulsions used.

In a separate environment, tackifying resins, materials that are incorporated to increase bond strength and the modulus of the resulting adhesive, are dissolved in known non-volatile carrier liquids, such as, for example, naphthenic process oil. Commonly used tackifying resins include C9 hydrocarbon resin, tree rosin, ester of rosin having softening points in the range of 25°–115° C. etc. The preferred tackifier is pentaerythritol ester of rosin, commercially available from Hercules Inc. under the trade name Permalyn® 3100. While C9 hydrocarbon, resin, tree rosin and esters of rosin are specified, other resins may be used so long as they are compatible with the selected latex. Commonly used process oils include hydrotreated petroleum hydrocarbon oils having a carbon number mainly in the range of C20 to C50 and with few enough aromatics and paraffinics to be classified as naphthenic oil. Exemplary oils of this type include Calsol 8240, available from Calumet Oil Co., Circosol 4240, available from R. E. Carroll, Process Oil C-255-E, available from C. E. Hall, etc. However, it is to be understood that while naphthenic process oil has been specified, other process oils that are not necessarily naphthenic may be used. For example, aromatic oil consisting of predominantly aromatic hydrocarbons having carbon numbers predominantly in the range of C20 to C50 may also be used.

The process oil and tackifying resin selected are mixed together and are preferably mixed at or above the melting point of the tackifying resin to ensure proper mixing. The tackifying resins used have melting points generally in the range of 25°–115° C. In the preferred method of the invention, the naphthenic process oil and tackifying resin are mixed together at a temperature of 210° F. to form a tackifying resin mixture to be added to the stabilized latex emulsion. It should be noted that tackifying resins will usually dissolve in the process oil without the benefit of additional heat; however, heating the mixture improves and enhances the dissolution of the resin and homogeneity of the resulting mixture.

In order to avoid brittleness in the final adhesive product, an antioxidant may be added to the process oil/tackifying resin mixture. Antioxidants of the hindered phenol type, such as, for example, Wingstay L available from Goodyear, or Santowhite Powder available from Harwick, are preferred. However, any compatible antioxidant may be used. Only a trace amount of antioxidant is required to avoid unacceptable brittleness in the final adhesive product.

Once the tackifying resin mixture is formed, it is ready for direct dissolution into the stabilized latex emulsion. The tackifying resin mixture is added to the stabilized latex emulsion under vigorous agitation until a homogeneous emulsion is formed. During agitation, trace amounts of defoamer, such as, for example, Foamkill 600 Series, available from Crucible Chemical; Foammizer M-55, available from C.P. Hall; and Nalco 5770 and 5772, available from Nalco Chemical, etc.; and bactericide, such as, for example, Amerstate 251, available from Drew Chemical; may be added to reduce foaming and microbial contamination.

It has been found that approximately 20 minutes are required to achieve a sufficiently homogeneous emulsion. However, different agitation times may be required depending upon the starting materials selected. Mixing these components in this manner eliminates the conventional step of emulsifying the tackifying materials prior to mixing with the latex emulsion. The present invention takes advantage of the excess emulsifiers present in the latex emulsion to enable the tackifying mixture to be added directly to the stabilized latex emulsion. The direct addition of the tackifying mixture to the stabilized latex emulsion is critical in achieving a high solids adhesive product.

A minor amount of mineral filler may be added, but care should be taken not to raise the viscosity to a level that will prevent the use of the adhesive in aerosol form, or in a pressurized canister dispenser.

In the case where the adhesive is a water-based adhesive having a latex emulsion of an acrylic homopolymer of copolymer, it is to be noted that a corrosion inhibitor, for example Cortec M-435, sold by Cortec Corporation of St. Paul, Minn., is preferably added when the adhesive is to be used in the spray system that forms part of this invention. This is due to the corrosive nature of the acrylic polymer, which can attack the cylinder wall and further corrode the components of the spraying system. Cortec M-435 has surprisingly been demonstrated to contribute to the adhesive properties of the adhesive as well.

In a preferred embodiment of the present invention in which no filler is used, the following range of proportions of the constituent components of the high solids adhesive are used. It is to be understood, however, that many variations in the amounts of the various constituent components may be made and that the following example is to be considered illustrative, not limiting.

| Ingredient | Amount wt % |
| --- | --- |
| 1. Cold polymerized high solids SBR latex (68–70% total solids) buffered to 11.0 pH with suitable caustic agent. | 35.0–45.0 |
| 2. RESIN CUT, comprising naphthenic rubber process oil, tackifying Resin (25°–115° C. melting point), and antioxidant (hindered Phenol type) | 25.0–55.0 |
| These components are mixed together with vigorous agitation until emulsion is homogeneous. Defoamer and bactericide/antimicrobial agent may be added to reduce foaming and contamination. Then blend in the following ingredients in turn, blending thoroughly before proceeding to the next step. | |

-continued

| Ingredient | Amount wt % |
|---|---|
| 3. Preservatives | 0.02–0.20 |
| 4. Water to desired precalculated final solids. | 21.0–20.0 |

It may also be desired to produce the adhesive with minor amounts of filler, which acts as a reinforcing agent, but typical amounts of filler additions used previously are too high, and would increase the viscosity of the adhesive to an unsuitable level. Accordingly, a preferred embodiment of the adhesive of the present invention, in which a filler is used, may have the following constituent components:

| Ingredient | Amount wt % |
|---|---|
| 1. Cold polymerized high solids SBR latex (68–70% total solids) buffered to 11.0 pH with suitable caustic agent. | 35.0–45.0 |
| 2. RESIN CUT, comprising naphthenic rubber process oil, tackifying Resin (25°–115° C. melting point), and antioxidant (hindered Phenol type) | 25.0–55.0 |
| These components are mixed together with vigorous agitation until emulsion is homogeneous. Defoamer and bactericide/antimicrobial agent may be added to reduce foaming and contamination. Then blend in the following ingredients in turn, blending thoroughly before proceeding to the next step. | |
| 3. Preservatives | 0.02–0.20 |
| 4. Water to desired precalculated final solids. | 1.0–20.0 |
| 5. Mineral Filler | 1.0–15.0 |

Constituents 4 and 5 may be in the form of a slurry of washed clay in water, such as, for example, Huber 90 clay available from Huber, mixed in an aqueous slurry with the appropriate amount of water. Using the above described constituent components results in a high solids adhesive, having approximately 72–76% solids content, the highest known of any sprayable adhesive in the industry. Previously, it was believed that the highest possible solids content for sprayable adhesives was in the range of 50–60% solids. While solids contents in the range of 72–76% solids are preferred, any range of solids content may be achieved by the present invention. For example, if solids content of greater than 76% or less than 72% are required, the water can be accordingly adjusted to arrive at the desired solids level. Thus, the invention is not limited to solids percentages in the range of 72–76%, but can be in any range up to approximately 95%+ solids content, provided the viscosity of the adhesive remains sufficiently low so that it can be sprayed from a canister by a propellant.

The viscosity of the adhesive resulting from employing the process of the present invention is in the range of 800–1200 centipoise (cps). The viscosity of the resultant adhesive may be adjusted as required in a particular application by modifying the amounts of water and mineral fillers added to the homogeneous emulsion.

A specific illustrative example of a high solids sprayable adhesive achievable by the present invention is shown below:

| Ingredient | Amount wt % |
|---|---|
| 1. High Solids SBR {68.0–73.0% T.S.} buffered to 10.5–11.0 PH with suitable caustic agent. | 44.45 |
| 2. a. Napthenic Process Oil | 17.78 |
| b. Tackifying resin {25–115 deg. C. S.P.} | 26.23 |
| c. Antioxidant {Hindered Phenol} | .44 |
| These components are mixed together at 210 deg. F. Mix 1 and 2 together with vigorous agitation until homogeneous. Defoamer and preservatives may be added to reduce foaming and contamination. | |
| 3. Water to desired viscosity blend until smooth. | 11.10 |

This formulation produces an adhesive with total solids content of 74.0 to 77.0% and a suitable spray viscosity.

The adhesive resulting from the mixture shown in Example 2 has a viscosity in the range of 800–1200 centipoise and a total solids content of 74.0–77.0% The adhesive also has no VOCs and bond strength in the range of 11–16 lb/in.

A preferred example of an adhesive employing a latex emulsion of an acrylic polymer is as follows:

| Ingredient | Amount wt % |
|---|---|
| 1. Acrylic latex 50–70% total solids buffered to 8.0 to 8.2 PH with a suitable caustic agent. | 70.0–90.0 |
| 2. Corrosion inhibitor | 1.50–4.00 |
| 3. Preservatives | .02–.20 |
| 4. Water to desired precalculated final solids. | 2.00–9.00 |

FIG. 1 illustrates, in schematic form, the adhesive application system 10 of the present invention. This system 10 is provided such that the application of the adhesive can be effected by spraying, which permits a fast, even application of adhesive over large surface areas, such as, for example, a flooring substrate to which a floor covering product is to be adhered.

System 10 includes a canister or cylinder 12 having a discharge valve 14, both of conventional design, at an opening of the cylinder. A hose 16 of a spray wand 18 will, in operation, be coupled to the discharge valve 14. For use in flooring adhesive applications, the hose 16 may preferably be about eight (8) feet or more in length so as to permit the wand to be moved about to spray a desired pattern of adhesive.

The cylinder 12 has an internal dip tube 20 for delivering the pressurized adhesive to the discharge valve 14 and through spray wand 18. Inside the cylinder is an adhesive composition formulated in accordance with the foregoing description, such that the adhesive is water-based, has a high solids content, is preferably solvent-free, and has a viscosity that makes it suitable for spraying. As noted previously a viscosity of between 800–1200 centipoise would be suitable for this service.

The adhesive is packaged in the cylinder with a pressurized gas that serves as a propellant to force the adhesive from the cylinder. The preferred propellant for this adhesive application system is non-flammable and non-polluting (ozone friendly). It has been determined, in developing this spray-based adhesive application system that a highly desirable propellant is a combination of a first propellant that will modify the character of the adhesive to better adapt it for spraying and a second propellant constituting an inert gas that is used to boost the pressure inside the cylinder to the desired overall level.

A preferred first propellant is available commercially as a refrigerant sold under the generic designation HFC 134A, which is sold by Elf Atochem and others. HFC 134A is a 1-1-1-2 tetrafluoroethane which has been cleared by the Environmental Protection Agency as a gas that does not cause ozone depletion. Preferably, the HFC 134A is used with the adhesive in about a 17.5:1 ratio (by weight) of adhesive to propellant. As an example, in a cylinder having a 100-pound (water) capacity, it is preferred to load the cylinder with 70 pounds of the adhesive composition and with four (4) pounds of HFC 134A.

Such a loading will produce only about 70–80 psi of pressure in the cylinder. The amount of propellant is satisfactory to impart the good sprayability properties to the adhesive, but is generally not a sufficient amount of gas to allow the entire quantity of the adhesive to be emptied from the cylinder under pressure. Accordingly, it is preferable to further add a sufficient quantity of an inert gas, preferably nitrogen, to increase the pressure in the cylinder to a minimum of 220 psi; and preferably to about 240–250 psi. This can be effected by pumping nitrogen into the cylinder under pressure, and monitoring a pressure gauge coupled to the cylinder to determine when the desired internal pressure has been attained. The loading of the adhesive and the HFC 134A propellant can be scaled up or down, as appropriate, for various cylinder capacities, while in each instance leaving adequate room for the addition of nitrogen.

Once the adhesive and the two propellant gases are packaged into the cylinder 12, the cylinder is transported to a floor covering installation site. The flooring substrate (not shown) is cleaned and otherwise prepared in a conventional manner. Spray wand 18 is operatively connected to discharge valve 14, and the adhesive is then sprayed onto the flooring substrate in the desired amount and in the desired pattern. Large surface areas may quickly and evenly be sprayed by use of this system, enabling high quality floor covering installations to be achieved with considerable savings in labor.

Adhesives made by the present invention are excellent adhesives for indoor or outdoor installation of flooring materials, such as, for example, wood plank or parquet, artificial turf, boat or other marine carpets, all indoor carpet, rubber flooring or cove base. These adhesives are believed to be especially well suited for adhering smooth-backed laminates to a substrate.

Additionally, lower solids content adhesives may also be produced using the method of the present invention. Lower solids adhesives are generally used in average installations involving carpets with woven synthetic, jute or low density urethane backings. However, it must be noted that lower solids content adhesives do not exhibit the increased bond strength, durability, freeze resistance, water resistance and improved drying characteristics of high solids content adhesives described above.

While this invention has been described in conjunction with specific embodiments thereof, it is evident that many alternative, modifications and variations will be apparent to those skilled in the art. Accordingly, the preferred embodiments of the invention as set forth herein are intended to be illustrative, not limiting. Various changes may be made without departing from the spirit and scope of the invention as defined herein and the following claims.

What is claimed:

1. An adhesive compound consisting essentially of a latex, a process oil, a tackifying resin and water, wherein an elastomeric component of said latex is selected from the group consisting of styrene butadiene, acrylic homopolymers, acrylic copolymers, acrylonitrile butadiene, polychloroprene, vinyl acetates, ethylene vinyl acetate copolymers, carboxylated styrene butadiene, and combinations of these elastomers, wherein said adhesive compound has a total solids content in the range of greater than 72%.

2. The adhesive compound of claim 1, wherein said tackifying resin comprises at least one of the group consisting of: C9 resin, wood rosin, ester of rosin and pentaerythritol ester of rosin.

3. The adhesive compound of claim 1, wherein said process oil comprises at least one member of the group consisting of: a severely hydrotreated petroleum hydrocarbon oil, having predominantly hydrocarbons with carbon numbers in the range of C20 to C50; and a naphthenic process oil.

4. The adhesive compound of claim 1, wherein said latex is styrene butadiene latex having total solids in the range of 65–75%.

5. An adhesive compound comprising:

35–45 wt. % of cold high solids styrene butadiene latex buffered to a pH of 11.0 using a caustic agent;

25–55 wt. % of a resin cut consisting essentially of naphthenic rubber process oil, a tackifying resin, and an anti-oxidant; and the balance water;

wherein said adhesive compound has a total solids content in the range of greater than 72%.

6. The adhesive compound of claim 5, wherein said process oil comprises severely hydrotreated petroleum hydrocarbon oil, having predominantly hydrocarbons with carbon numbers in the range of C20 to C50.

7. The adhesive compound of claim 5, wherein said tackifying resin comprises at least one of the group consisting of: C9 hydrocarbon resin, wood rosin, ester of rosin and pentaerythritol ester of rosin.

* * * * *